United States Patent

[11] 3,599,748

[72] Inventor Caperton B. Horsley
East Walpole, Mass.
[21] Appl. No. 876,322
[22] Filed Nov. 13, 1969
[45] Patented Aug. 17, 1971
[73] Assignee Braxton Corporation
Medfield, Mass.

[54] COUPLING
10 Claims, 11 Drawing Figs.

[52] U.S. Cl. .................................................. 181/.5 EM,
285/116
[51] Int. Cl. ...................................................... G01v 1/00
[50] Field of Search .......................................... 181/.5 EM;
179/115; 285/114, 115, 116

[56] References Cited
UNITED STATES PATENTS
3,489,445 1/1970 Kammerer, Jr. ............... 285/115 X
3,123,728 3/1964 Kreishorte .................... 181/.5 EM
2,376,058 5/1945 Jeffreys ........................ 285/116
156,006 10/1874 Wolfe ........................... 285/115

Primary Examiner—Rodney D. Bennett, Jr.
Assistant Examiner—Brian L. Ribando
Attorney—W. R. Hulbert ABSTRACT: A coupling comprising a first threaded member bearing external threads and providing a first bearing surface adapted to deliver a force substantially parallel to the axis of the threads, a second threaded member bearing internal threads threadedly engaged to the first threaded member, the second threaded member providing a second bearing surface adapted to deliver a force substantially parallel to the axis and directed in the direction opposite to the force delivered by the first bearing surface, and a stress member providing a third bearing surface engaging the first bearing surface and an opposed fourth bearing surface engaging the second bearing surface, the stress member being maintained in a state of stress by the forces applied to the third and fourth bearing surfaces by the first and second bearing surfaces, respectively; the coupling having a cross section perpendicular to the axis wherein mutually engaged portions of the external threads and the internal threads are radially spaced from the stress member.

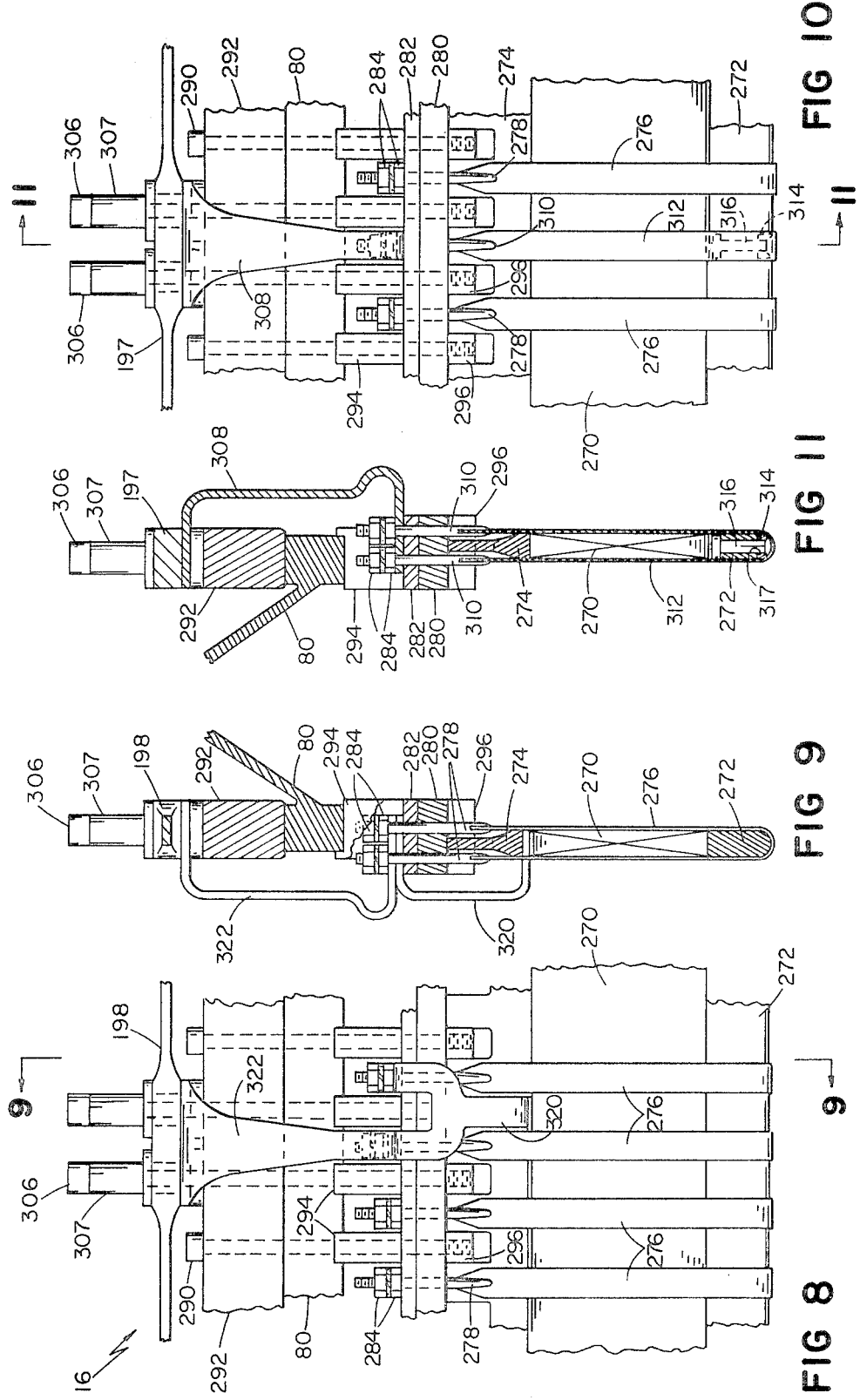

COUPLING

This invention relates to coupling and particularly to coupling members subjected to intense stresses.

An object of this invention is to provide for reliable, durable, and noninterfering coupling between members subject to intense and rapid stress reversals.

Another object is to couple several oscillating members into a uniformly oscillating assembly.

Another object is to transmit oscillating forces efficiently between force-transmitting members, such as between oscillating masses and elastic columns or between adjacent portions of such columns.

Still another object is to provide reliable and durable apparatus for producing sound fields of high energy useful for particle agglomeration.

The invention features a coupling comprising a first threaded member bearing external threads and providing a first bearing surface adapted to deliver a force substantially parallel to the axis of the threads, a second threaded member bearing internal threads threadedly engaged to the first threaded member, the second threaded member providing a second bearing surface adapted to deliver a force substantially parallel to the axis and directed in the direction opposite to the force delivered by the first bearing surface, and a stress member providing a third bearing surface engaging the first bearing surface and an opposed fourth bearing surface engaging the second bearing surface, the stress member being maintained in a state of stress by the forces applied to the third and fourth bearing surfaces by the first and second bearing surfaces, respectively; the coupling have a cross section perpendicular to the axis wherein mutually engaged portions of the external threads and the internal threads are radially spaced from the stress member.

In a preferred embodiment, one such coupling is located on each end of an elastic column to couple an end mass on each end of the column, one end mass comprising an electromagnetic motor armature arranged to provide controlled periodic longitudinal forces acting on one end of the column of said forces, the period equal to the period of the longitudinal vibrational mode of the elastic column, and the other end mass comprising a force transmitting structure providing an extended gas-interacting surface transverse to the column; the column itself comprises two tubular elements coupled by two such externally threaded members, one on the end of each element, a single internally threaded member having a set of internal threads at each end for receiving one such externally threaded member, and two stress members, each compressed between a bearing surface provided by a threaded member and a bearing surface provided by the internally threaded member, the coupling having a cross section through each externally threaded member perpendicular to the common axis of the threads wherein mutually engaged portions of the external and internal threads are separated by an annular space from the adjacent stress member; each externally (first) threaded member is of cylindrical form, with a flange providing the first bearing surface and a threaded portion extending away from the first bearing surface beyond the mutually engaged threads; the internally (second) threaded member has a shoulder providing each second bearing surface, and a tapered portion, carrying the internal threads, which diminishes a cross section with diminishing distance from the first bearing surface, and these threads extend toward the first bearing surface beyond the mutually engaged threads; and each stress member is constructed to encircle the mutually engaged threads in the shape of a truncated cone having a basal edge defining a fourth bearing surface and a truncated edge defining a third bearing surface.

Other objects, features, and advantages will appear from the following description of a preferred embodiment of the invention, taken together with the attached drawings thereof, in which:

FIG. 8 is a view (from direction A in FIG. 7) of a portion of the motor armature removed from the device;

FIG. 9 is a cross-sectional view of the armature along line 9—9 of FIG. 8 with a portion broken away;

FIG. 10 is another view (from direction B in FIG. 7) of the motor armature removed from the device; and FIG. 11 is a cross-sectional view of the armature along line 11—11 of FIG. 10.

Figure 1:
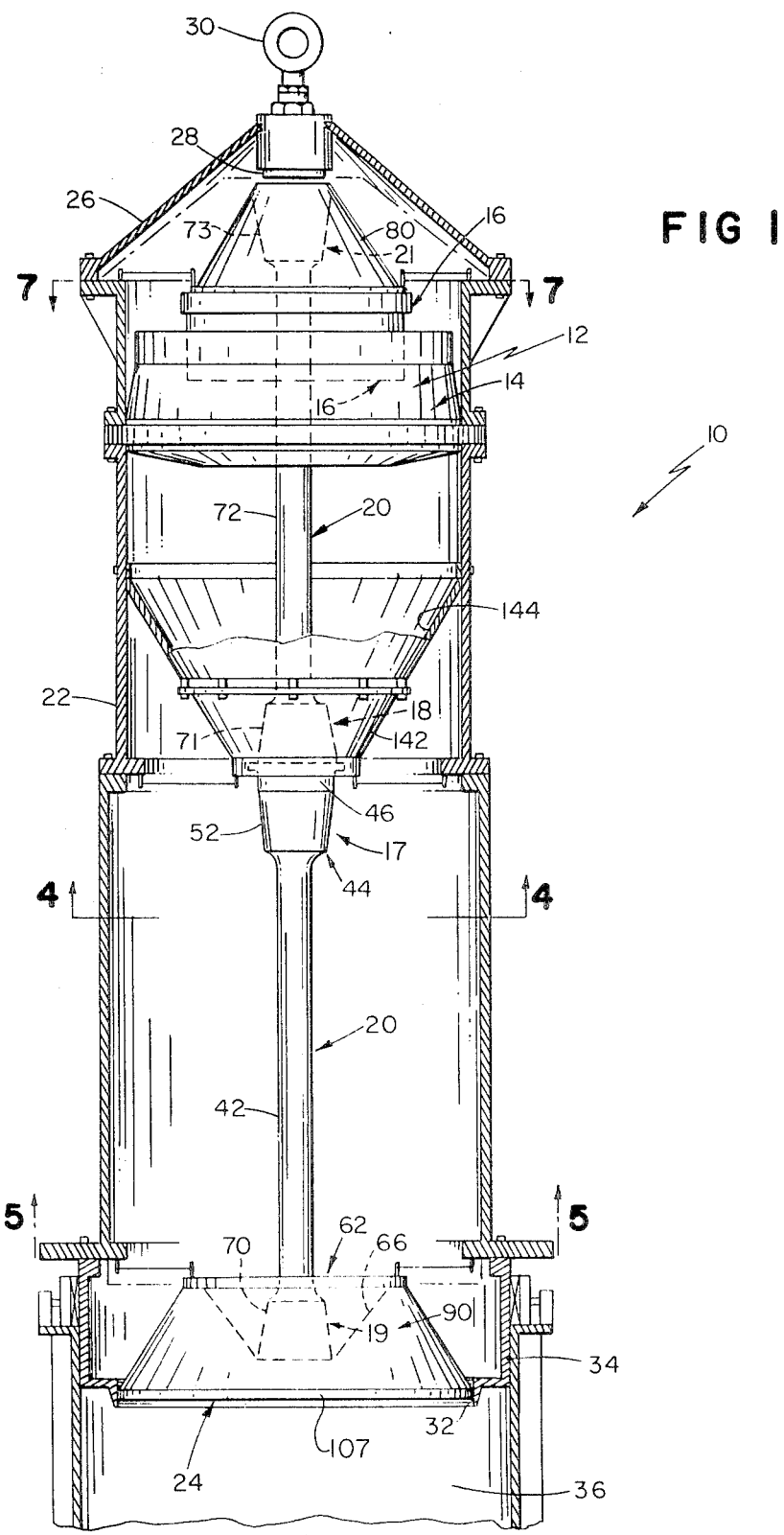
FIG. 1 is a partly schematic view of a preferred embodiment of the present invention, with portions of the housing removed.

FIG. 1 shows schematically an acoustic stimulator 10 including an elastic column 20 supported, by means discussed hereinafter, along the axis of cylindrical housing 22, a motor 12 including a magnet assembly 14 secured to housing 22 and an armature 16 fastened to the upper end of elastic column 20, and a piston assembly 90, fastened to the lower end of elastic column 20 and having an extended surface 24 forming the upper wall of acoustic chamber 36. Housing cap 26 is bolted to the upper end of housing 22 and has affixed a support ring 30 and lock 28, providing means for immobilizing elastic column 20 during shipment.

Figure 2:
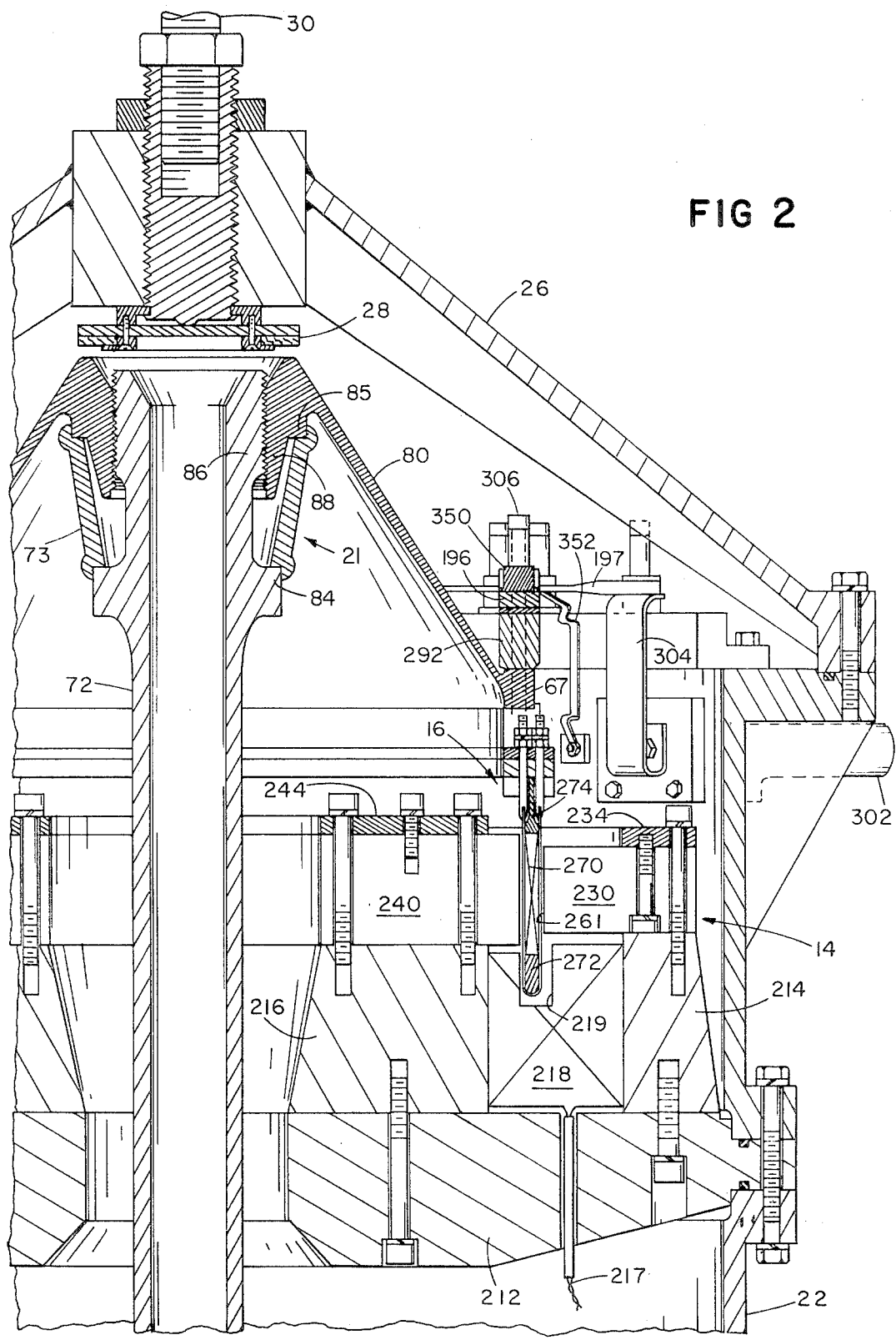
FIG. 2 is a longitudinal sectional view of the upper portion of the apparatus of FIG. 1 showing particularly the motor.
Figure 3:
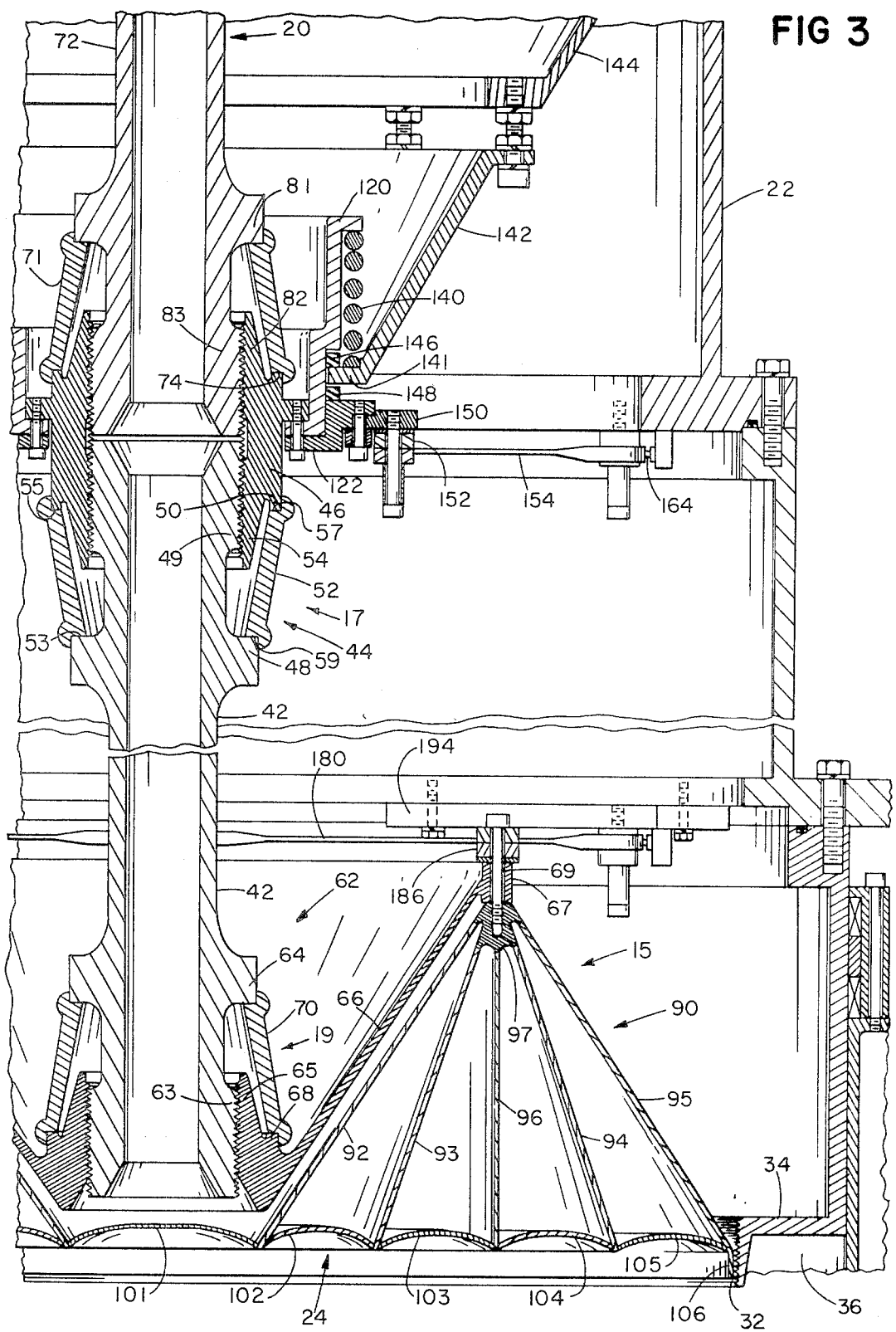
FIG. 3 is a longitudinal sectional view of the central and lower portions of the device showing particularly the gas-interacting piston, the central support, and the couplings connecting tubular elements and attaching an end to the column.

Referring to FIG. 1 and FIG. 3, elastic column 20 comprises two identical spring tubes 42, 72, each joined to spring-tube-coupling member 46 by identical couplings 17, 18, respectively. Lower spring tube 42 has a flange 48 providing bearing surface 53 and has also an externally threaded member 49 threadedly engaged with internally threaded, tapered portion 54 of coupling member 46. The threads of portion 54 extend beyond the mutually engaged threads in the direction of surface 53, while the threads of member 49 extend beyond the mutually engaged threads in the direction away from surface 53. Coupling member 46 has a shoulder 50 providing a bearing surface 55. Stress member 52 provides bearing surface 57 engaging bearing surface 55 and bearing surface 59 engaging bearing surface 53. Stress member 52 is compressed longitudinally between flange 48 and shoulder 50 during assembly to a degree such that the static tensile stresses (typically 70,000 p.s.i.) in threaded member 49 and threaded portion 54 exceed in magnitude the transitory stresses produced in each respectively during oscillation. The attachment by coupling 18 of upper spring tube 72 to coupling member 46 with the compression of stress member 71 between flange 81 and shoulder 74 is the same in all respects as the attachment by coupling 17 of spring tube 42 to coupling member 46 with the compression of stress member 52 described above. The distal end 62 of lower spring tube 42 carries a flange 64 and an externally threaded member 63. Piston cone 66 having the general form of a truncated cone has a tapered, internally threaded hub 65 and a shoulder 68. Hub 65 is attached by coupling 19 to the distal end 62 of spring tube 42 with the compression of stress member 70 between flange 64 and shoulder 68 in the same manner as described above for the attachment by coupling 17 of coupling member 46 to the proximal end 44 of spring tube 42. Driver cone 80 (FIG. 2) is identical to piston cone 66 and is attached by coupling 21 to an end of upper spring tube 72 with the compression of stress member 73 between flange 84 and shoulder 85 in the same manner as coupling member 46 is attached by coupling 17 to an end of spring tube 42. Each of identical piston cone 66 and driver cone 80 has at its periphery an integral mounting ring 67 with 48 mounting holes 69 disposed equally around its circumference.

Elastic column 20 is made of stainless steel (e.g., E 4340 Aircraft Quality Steel). The mass of motor armature 16 is equal to the mass of piston assembly 90 which has a mass of about 60 pounds. Spring tubes 42, 72 have central transverse cross-sectional areas of 3 square inches, and the resonant period of elastic column 20 in its longitudinal vibrational mode is about 1/400 second. Elastic column 20 is bilaterally symmetric about a transverse plane extending approximately across the junction of spring tubes 42 and 72, and is rotationally symmetric about its central longitudinal axis.

Figure 4:
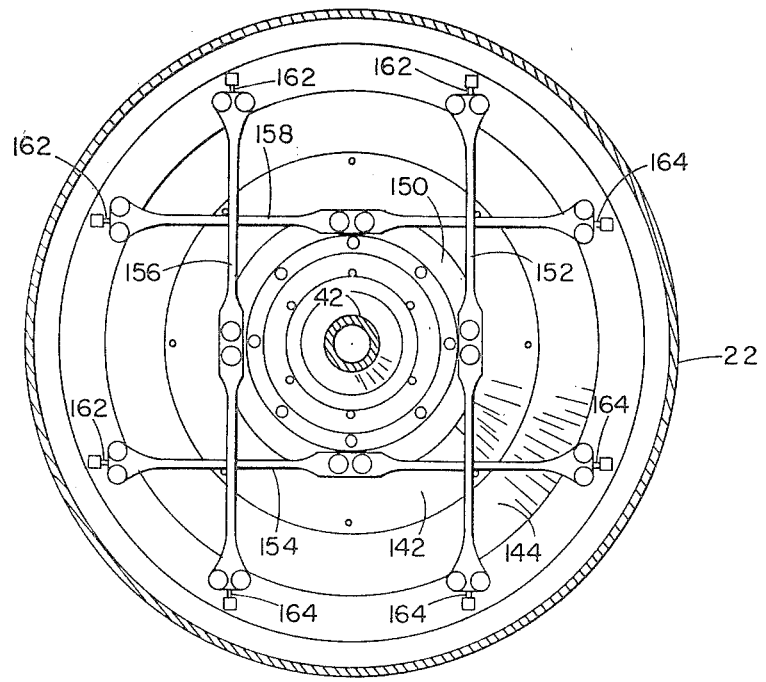
FIG. 4 is a transverse section (at line 4—4 of Fig. 1) showing the central constraint structure.
Figure 5:
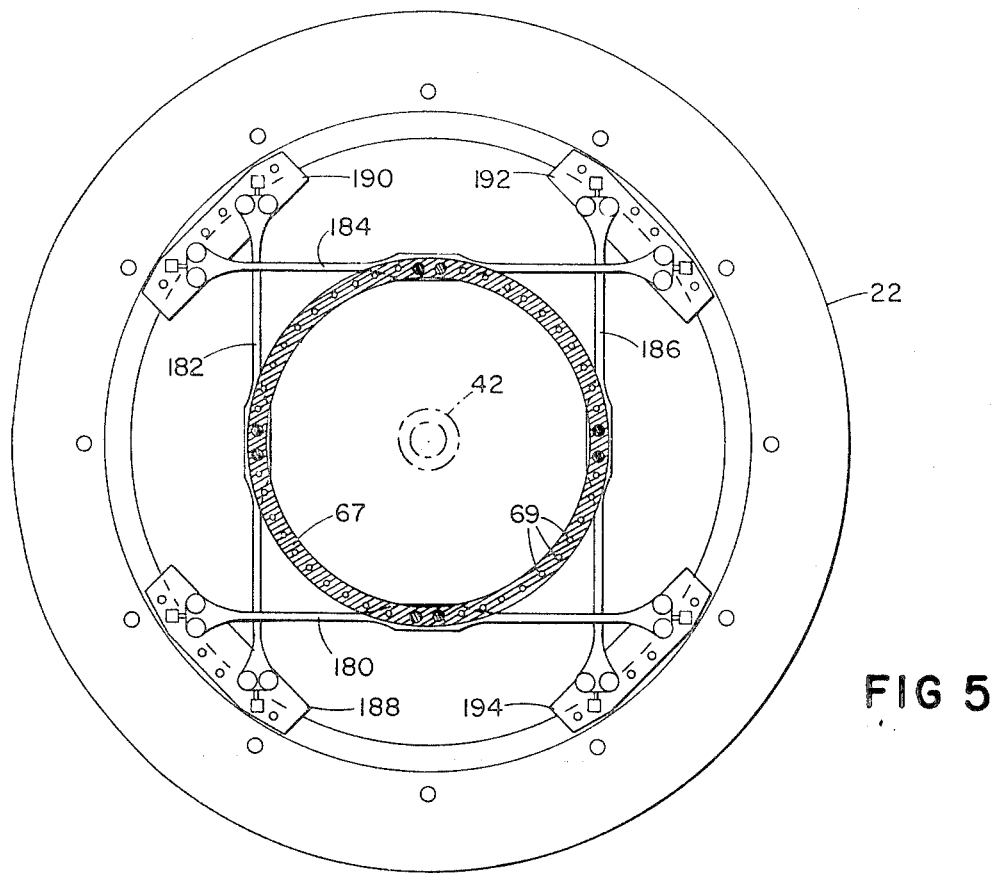
FIG. 5 is a transverse cross section (at line 5—5 of Fig. 1) showing the lower constraint structure.

Bolted to spring-tube-coupling member 46 is annular support bracket 120 and stepped mounting ring 122. Elastic column 20 is supported on support bracket 120 resting on helical support spring 140, which is in turn supported by an apical portion 141 of a conical bracket 142 bolted to extension 144 of housing 22. Two high durometer rubber bumper rings 146, 148 encircling support bracket 120 above and beneath bracket portion 141 prevent excessive flexing of support spring 140. Adjustment ring 150 is clamped onto mounting ring 122. As shown particularly in FIG. 4, the transverse position of elastic column 20 is maintained by four flexible positioning straps 152, 154, 156, 158 bolted centrally to adjustment ring 150 and peripherally to housing 22. The lengthwise position as well as the tension of positioning strap 152 is adjustable during assembly by adjustment screw 162 at one end and adjustment screw 164 at the other end. Positioning straps 154, 156, and 158 are similarly adjustable. As shown particularly in FIG. 5, the transverse position of piston cone 66 is maintained by flexible positioning straps 180, 182, 184, 186 bolted centrally to mounting ring 67 and peripherally to brackets 188, 190, 192, 194 which are supported on housing 22. The lengthwise position and tension of positioning straps 180, 182, 184, 186 are adjustable in the same way as the lengthwise position and tension strap 152.

Figure 7:
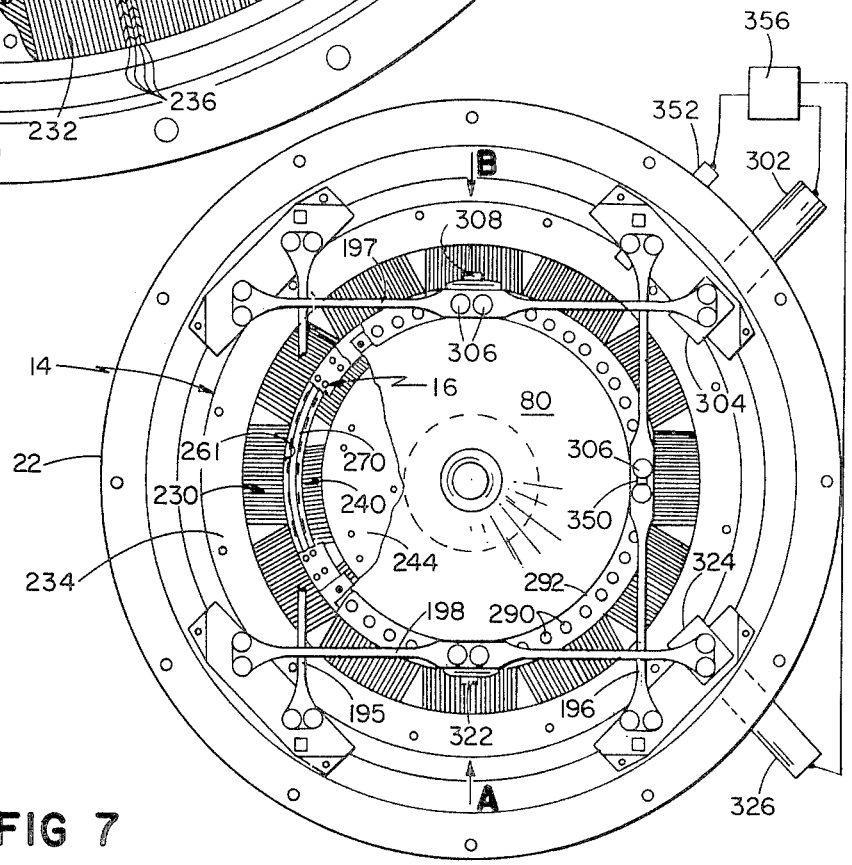
FIG. 7 is a transverse view of the device with the top removed and portions cut away to reveal the motor.

As shown particularly in FIG. 7, the transverse position of driver cone 80 is maintained by positioning straps 195, 196, 197, 198 bolted centrally to driver cone 80 and peripherally to housing 22. Straps 197, 198 are made of material both strong and of good electrical conductivity such as copper-beryllium, and are isolated electrically from driver cone 80 and from housing 22. Straps 152, 154, 156, 158, 180, 182, 184, 186, 195, and 196 are made, e.g., of stainless steel.

As shown particularly in FIG. 3, bolted to mounting ring 67 is piston assembly 90 consisting of four truncated conical sheets 92, 93, 94, 95, and cylindrical sheet 96, all attached to junction 97, and five facepieces 101, 102, 103, 104, 105 shaped to avoid buckling and forming extended surface 24. Facepiece 101 has the general shape of a shallow dish and is affixed to and spans the interior of conical sheet 92. Dished annular facepiece 102 is attached to and spans the interval between conical sheet 92 and conical sheet 93. Dished annular facepiece 103 is attached to and spans the interval between conical sheet 93 and cylindrical sheet 96. Dished annular facepiece 104 is attached to and spans the interval between cylindrical sheet 96 and conical 94. Facepiece 105 has the general shape of a dished annulus and carries in addition a forward protruding lip 106. Facepiece 105 is affixed to and spans the interval between conical sheet 94 and conical sheet 95. The outer cylindrical surface 107 (30-inch diameter in preferred embodiment) of facepiece 105 fits snugly but movably (e.g., 0.030 to 0.040 in. clearance) in orifice 32 of housing portion 34.

Figure 6:
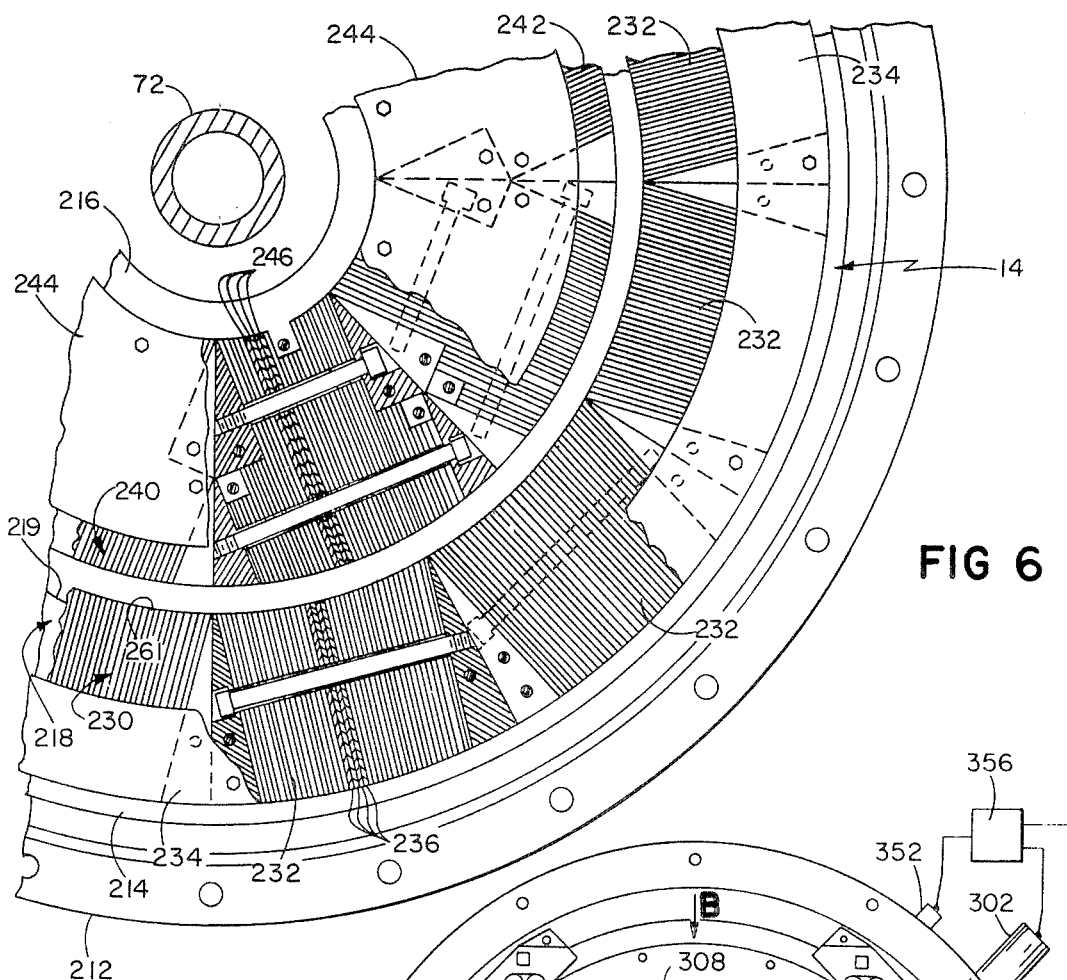
FIG. 6 is a transverse view of the magnet with portions cut away.

Motor magnet 14, shown particularly in FIGS. 2 and 6, includes annular magnet base 212 bolted at its periphery to housing 22. Annular magnet outer ring 214 and annular magnet inner ring 216 are bolted concentrically to magnet base 212. Annular coil 218 fits in the space between magnet outer ring 214 and magnet inner ring 216. The winding of coil 218 runs tangentially and is connected to leads 217. Coil 218 contains an annular slot 219. Outer annular pole piece 230 is bolted to magnet outer ring 214, and inner annular pole piece 240 is bolted to magnet inner ring 216 leaving an annular gap 261 between inner pole 240 and outer pole 230. Outer pole 230 consists of 12 segments 232 bolted to outer retainer 234. Each of the segments 232 is made up of lamina 236 bolted together and electrically insulated from one another with the short dimension of the lamina running approximately circumferential to the axis of motor magnet 14. Inner pole 240 is made up of eight segments 242 bolted to inner retainer 244 to form a generally annular structure. Each segment 242 is made up of lamina 246 bolted together with the short dimension of the lamina 246 running approximately circumferential to the axis of motor magnet 14. The lamina prevent interfering circumferential fields from being formed because of current flow in armature 16. Motor armature 16 supported by driver cone 80 fits with clearance within the gap 261 between outer pole 230 and inner pole 240 with its end protruding into the slot in coil 218. Magnet base 212, magnet outer ring 214, magnet inner ring 216, lamina 236 and 246 are made of ferromagnetic material suitable for conducting magnetic flux.

Referring to FIGS. 2, 8, 9, 10, and 11, armature 16 includes coil 270 circumferentially wound around an axis and clamped between ring-shaped bottom insulator 272 and top insulator 274 by binding webs 276 distributed at equal intervals around armature 16. Each binding web 276 is attached (e.g., by silver soldering) to two pins 278 which pass through insulating ring 280 and insulating ring 282. All binding webs 276 and pins 278 are made of stainless steel except for connecting web 312 and associated pins 310 which are used for electrical connections and are made, e.g., of copper-beryllium. Pins 278 are drawn up by nuts 284 bearing on ring 282. Armature 16 is bolted to driver cone 80 by bolts 290 passing through counterweight 292, driver piston 80, spacers 294, insulator ring 282, and insulator ring 280 into nuts 296. Electrical connections for coil 270 are made from terminal 302 to connector 304, to which is bolted strap 197 made of copper-beryllium alloy which is bolted by insulated bolts 306 to armature 16. Clamped beneath and making electrical contact with strap 197 is one end of connector 308 which is clamped at its other end in contact with electrical conducting pins 310 made of copper-beryllium and affixed to connecting web 312 made of copper-beryllium. Web 312 makes electrical contact through connecting member 314 and spool-shaped member 316, which is snugly secured in aperture 317 of member 314, to the lower end of coil 270. The upper end of coil 270 communicates electrically with connector 320 made of copper-beryllium which is in turn clamped in electrical contact with connector 322, again made of, e.g., copper-beryllium. An end of connector 322 is clamped between insulator ring 292 and strap 198 making electrical contact with strap 198. Strap 198 is bolted peripherally to and makes contact with connector 324 (affixed to but insulated from housing 22) which is connected to terminal 326, (FIG. 7). Terminals 302, 326 are connected to the output of current source 356 (shown schematically), which uses conventional circuitry to provide an alternating current of controllable amplitude at a frequency controllable in a range including the resonant frequency of elastic column 20. Amplitude control is achieved, e.g., by a conventional accelerometer 350 affixed to the central part of strap 196. The output of accelerometer 350 is conducted electrically through (copper-beryllium) strap 196 (which is insulated from armature 16 and from housing 22) thence to terminal 352 (attached to but insulated from housing 22), thence to a control input of current source 356. Bolts 306 and similar bolts used elsewhere on elastic column 20 are preferably long shanked and tightened against collars 307 to produce significant elastic deformation (typically 0.003 to 0.009 inch) in shank.

During assembly of coupling 17, stress member 52 is compressed longitudinally between flange 48 of spring tube 42 and shoulder 50 of coupling member 46 by the progressive engagement of threaded portions 54 and 49. A compression stress is thus produced in stress member 52 while a tensile stress is produced in threaded portions 54 and 49.

Under the influence of the applied stress, portions 49, 54 are slightly elongated by elastic deformation with a resulting slight increase in thread pitch. Since both threaded portions 49, 54 are in tension the increase of pitch of one portion approximately offsets the increase of the other so that the load is distributed fairly uniformly along the engaged threads.

The taper of portion 54 further contributes to uniformity of load along the threads because the tensile force in portion 49 progressively decreases at more proximal cross sections as force is transferred across the threaded engagement to portion 54. Correspondingly the tensile force in portion 54 increases. Because portion 54 is tapered the tensile stress therein is carried by a smaller area at cross sections where the force is smaller so that the stress (that is, force divided by area) is approximately uniform at all cross sections, and consequently the stretching of threads is also uniform. Couplings 18, 19, 21 are similarly assembled with similar results.

In operation motor magnet 14 is energized by connecting leads 217 to a source of DC electric current, thereby producing a magnetic flux following a path through magnet base 212, magnet outer ring 214, outer pole 230, radially across gap 261 in which is situated armature 16, through inner pole 240 and magnet inner ring 216 back to magnet base 212. A magnetic flux radial in coil 270 of armature 16 is thus produced (in preferred embodiments, the field in this gap is 10,000 gauss).

The tangentially flowing AC current in armature coil 270 interacts with the radial magnetic flux in gap 261 between outer pole 230 and inner pole 240 to produce a reciprocating longitudinal force on coil 270. The reciprocating force is in turn transmitted to armature 16 and thence to driver cone 80 at the upper end of elastic column 20. The frequency of the AC electrical source supplying armature 16 is adjusted to correspond to the fundamental resonant longitudinal vibration frequency of elastic column 20 (about 400 Hz., in the preferred embodiment), and when this adjustment has been made, a standing longitudinal vibration is set up in elastic column 20. Because of the identical structure of the elastic column on either side of its transverse median plane and because of the equal masses of the piston assembly 90 bolted to the lower end of elastic column 20 and of armature 16 bolted to the upper end of elastic column 20, this standing vibration will be symmetrical about the median transverse plane of elastic column 20, with a velocity minimum occuring at or near the median plane and a velocity maximum occuring at the upper and lower extremities of elastic column 20. Support bracket 120 being situated near a velocity minimum point will give a minimum of interference with the oscillations of elastic column 20, while armature 16 and piston assembly 90, being situated near points of maximum velocity, will have a strong interaction with respectively the magnetic field of magnet 14 and acoustic chamber 36.

During operation elastic column 20 passes through alternate states of contraction and extension. In the contracted state the net force acting across transverse section $x-x$ of coupling 17 is compressive, but the force acting in portions 49, 54 although reduced in magnitude remains tensile while the compressive force acting through stress member 52 is increased in magnitude. The force acting in portions 49, 54 thus is continuously tensile, and a continuous tensile engagement is maintained between the threads of portion 49 and the threads of portion 54. The operation is identical in couplings 18, 19, 21.

When the amplitude of the oscillations of elastic column 20 is low, accelerometer 350 senses this fact and acting through current source 356 causes the maximum design current to be supplied to coil 270. With maximum current in coil 270, the reciprocating forces produced feed oscillatory power into elastic column 20 in excess of the power drained from column 20 by losses and by interaction of piston assembly 90 with the contiguous gas. The amplitude of oscillation in column 20 will therefore increase. As the amplitude increases both the power fed into and the power drained from column 20 will increase (because of the increased motion of the armature 16 and the piston assembly 90), but the power fed will continue to exceed the power drained, and the amplitude will continue to increase to values many times greater than the armature forces could produce in a nonresonant structure. When the amplitude rises to the design limit (in the preferred embodiment, acceleration of 800g and excursion of 0.050 inch), accelerometer 350, sensing this condition, causes current source 356 to reduce the current supplied to coil 270 appropriately to limit the amplitude to the design value. The reduced current required to maintain the design value of amplitude will vary depending on conditions in acoustic chamber 36, the accuracy with which the electrical supply frequency matches the resonant frequency of elastic column 20 and other factors.

Operating at design values, acoustic stimulator 10 may be utilized to produce a sonic field having up to about 1.3 p.s.i. peak pressure in closed acoustic chamber 36. The alternating gas velocity of this sonic field causes differential movement of small (say 3 micron diameter) and large (say 50 micron diameter) particles suspended in the gas filling chamber 36. The smaller particles therefore are caused to collide and coalesce with larger particles and thereby become more readily removable from suspension.

Other embodiments will occur to those skilled in the art.

What I claim is:

1. A coupling comprising
   a first threaded member bearing external threads and providing a first bearing surface adapted to deliver a force substantially parallel to the axis of said threads,
   a second threaded member bearing internal threads threadedly engaged to said first threaded member, said second threaded member providing a second bearing surface adapted to deliver a force substantially parallel to the axis of said threads and directed in the direction opposite to the said force delivered by said first bearing surface, and
   a stress member providing a third bearing surface engaging said first bearing surface and an opposed fourth bearing surface engaging said second bearing surface, said stress member being maintained in a state of stress by said forces applied to said third and fourth bearing surfaces by said first and second bearing surfaces, respectively,
   said coupling having a cross section perpendicular to said axis wherein mutually engaged portions of said external threads and said internal threads are radially spaced from said stress member.

2. The coupling of claim 1 in which said state of stress maintained in said stress member is predominantly compressive.

3. The coupling of claim 2 in which said stress member is constructed to encircle said mutually engaged threads.

4. The coupling of claim 3 in which said second threaded member has a shoulder providing said second bearing surface.

5. The coupling of claim 4 in which said first threaded member is of cylindrical form and has a flange providing said first bearing surface.

6. The coupling of claim 4 in which said second threaded member has a tapered portion carrying said internal threads diminishing in cross section with diminishing distance from said first bearing surface.

7. The coupling of claim 5 in which said stress member has the shape of a truncated cone with a basal edge and a truncated edge and wherein said basal edge defines said fourth bearing surface and said truncated edge defines said third bearing surface.

8. The coupling of claim 1 in which said second member has a threaded portion extending toward said first bearing surface beyond said mutually engaged threads and said first member has a threaded portion extending away from said first bearing surface beyond said mutually engaged threads.

9. In apparatus for generating a sound field comprising an elastic column constructed to maintain its structural integrity when subjected to vibrational stresses, a first end mass comprising an electromagnetic motor armature arranged to provide periodic longitudinal forces acting on an end of said column, the period of said forces being equal to the period of the longitudinal resonant vibrational mode of said column, a control system for controlling the amplitude of said longitudinal motion of said column, and a second end mass comprising a force-transmitting structure providing an extended gas-interacting surface transverse to said column, a coupling for attaching one said end mass to an end of said column comprising a first threaded member on an end of said column bearing external threads and having a flange providing a first bearing surface adapted to deliver a force substantially parallel to the axis of said column, a second threaded member attached to the said end mass adjacent said end of said column, having a shoulder providing a second bearing surface adapted to deliver a force substantially parallel to said axis and directed in the direction opposite to that delivered by said first bearing surface, said second member bearing internal threads threadedly engaged to said first threaded member, and a stress member structured to encircle said mutually engaged threads, providing a third bearing surface engaging said first bearing surface and an opposed fourth bearing surface engaging said second bearing surface, said stress member being maintained in a state of predominantly compressive stress by forces applied to said third and fourth bearing surfaces by said first and second bearing surfaces, respectively, said coupling having a cross section perpendicular to said axis wherein mutually engaged portions of said external threads and said internal threads are separated by an annular space from said stress member.

10. A coupling assembly for connecting two tubular elements comprising two externally threaded members, each secured to an end of one said tubular element, each bearing external threads and having a flange providing a first bearing surface adapted to deliver a force substantially parallel to the axis of said threads, an internally threaded member bearing two sets of internal threads, one at each end thereof, each set of internal threads being threadedly engaged with the external threads of one of said tubular elements, said internally threaded member having opposed shoulders providing opposed second bearing surfaces, each facing one of said first bearing surfaces and adapted to deliver a force substantially parallel to said axis and directed in the direction opposite to the said force delivered by the facing one of said first bearing surfaces, two stress members, each providing a third bearing surface engaging one said first bearing surface and an opposed fourth bearing surface engaging one said second bearing surface, each said stress member being maintained in a state of predominantly compressive stress by said forces applied to said third and fourth bearing surfaces by said first and second bearing surfaces, respectively, said coupling having a cross section through each externally threaded member perpendicular to said axis wherein mutually engaged portions of said external threads and said internal threads are separated by an annular space from the adjacent said stress member.